US009458765B2

(12) United States Patent
Fujii et al.

(10) Patent No.: US 9,458,765 B2
(45) Date of Patent: Oct. 4, 2016

(54) INTAKE AIR COOLING SYSTEM

(71) Applicant: MITSUBISHI HITACHI POWER SYSTEMS, LTD., Yokohama-shi, Kanagawa (JP)

(72) Inventors: Keita Fujii, Tokyo (JP); Yasuoki Tomita, Tokyo (JP); Jiro Asakuno, Tokyo (JP); Masaru Takamatsu, Tokyo (JP); Tadakuni Nishio, Tokyo (JP); Tatsunao Nagashima, Tokyo (JP); Katsuhiro Hotta, Tokyo (JP); Masashi Nishimura, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 397 days.

(21) Appl. No.: 14/220,460

(22) Filed: Mar. 20, 2014

(65) Prior Publication Data

US 2014/0290253 A1    Oct. 2, 2014

(30) Foreign Application Priority Data

Mar. 27, 2013  (JP) ................................. 2013-066829

(51) Int. Cl.
| F02C 7/143 | (2006.01) |
| F02C 7/18 | (2006.01) |
| F02C 7/141 | (2006.01) |
| F02C 7/24 | (2006.01) |

(52) U.S. Cl.
CPC ............. *F02C 7/1435* (2013.01); *F02C 7/143* (2013.01); *F02C 7/141* (2013.01); *F02C 7/185* (2013.01); *F02C 7/24* (2013.01); *F05D 2260/212* (2013.01); *F05D 2260/602* (2013.01)

(58) Field of Classification Search
CPC ...... F02C 7/1435; F02C 7/185; F02C 7/143; F02C 7/141; F02C 7/24; F05D 2260/212; F05D 2260/602
See application file for complete search history.

(56) References Cited

U.S. PATENT DOCUMENTS

2004/0103667 A1* 6/2004 Frutschi ................. F02C 7/045
60/775
2009/0049836 A1    2/2009 Erickson et al.

FOREIGN PATENT DOCUMENTS

| JP | 2007-120479 A | 5/2007 |
| JP | 4328269 B2 | 9/2009 |

OTHER PUBLICATIONS

It Unversita' Degli Studi di Bologna, "A Parametric Evaluation of Fogging Technology for Gas Turbine Performance Enhancement", Ph. D. Thesis, 2004.
Office Action dated May 2, 2016, issued in counterpart Taiwanese Patent Application No. 103110352. (4 pages).

* cited by examiner

*Primary Examiner* — Jermie Cozart
(74) *Attorney, Agent, or Firm* — Westerman, Hattori, Daniels & Adrian, LLP

(57) ABSTRACT

An intake air cooling system 100 for a gas turbine 18 is provided with: an intake duct 12 for leading intake air from an intake-air inlet 22 to a compressor 14 of the gas turbine, the intake duct having a vertical duct 12c and a manifold part 12d disposed on a downstream side of the vertical duct; a cooling part 26 provided in the intake duct to cool the intake air by heat exchange with a cooling medium which is introduced from an outside; a filter part 42 provided on an inlet side of the manifold part to remove impurities contained in the intake air introduced through the vertical duct; and a drain catcher 110 constituted by a gutter member provided immediately above the filter part along inner wall surfaces 12c1, 12c2 of the vertical duct, the drain catcher being configured to collect drain water flowing along the inner wall surfaces of the vertical duct.

6 Claims, 3 Drawing Sheets

INTAKE AIR COOLING SYSTEM

TECHNICAL FIELD

The present invention relates to an intake air cooling system for cooling intake air of a gas turbine.

BACKGROUND ART

In a gas turbine for power generation which is configured by a compressor, a combustor, a turbine, etc., the temperature of air taken into the compressor affects output of the turbine. For instance, in summer season when the atmospheric temperature is high, density of the intake air decreases and thus a mass flow rate decreases, hence the output of the turbine decreases. To suppress this sort of decrease in output of the turbine, intake air cooling systems have been developed, including an intake air cooling system equipped with an intake air cooling coil for lowering the temperature of air taken in from outside by heat exchange with cooling medium and an intake air cooling system which sprays water to the intake air to cool the intake air using heat of vaporization of the sprayed water. With the intake air cooling system equipped with the intake air cooling coil, moisture in the atmosphere is cooled by heat exchange with the intake air cooling coil and condensed into drain water. The drain water is then collected by a drain pan arranged below the intake air cooling coil and is discharged from a drain pipe.

In the case where this intake air cooling system is used, however, the drain water adhering to a surface of the intake air cooling coil may scatter to a downstream side along with the intake air passing through the intake air cooling coil, or the drain water may fail to be collected by the drain pan and leak from the drain pan. Therefore, there are issues such as damage to blades of the compressor caused by erosion or lock of the compressor due to entry of the drain water into the compressor disposed on the intake side of the gas turbine. As a conventional technique for preventing the drain water from entering the compressor of the gas turbine, Patent Reference 1 discloses an intake air cooling device for a gas turbine, in which a mist removing means is provided on a downstream side of the intake duct of a vaporizer so as to remove mist from the intake air by collecting unvaporized mist. Further, Patent Reference 2 discloses a gas turbine which is provided with grooves that are formed in rotation symmetry in an inner wall surface of a flow passage, where operating air supplied with water flows, or in a rotor or a casing flow passage surface of the gas turbine, so as to collect mist adhering to the inner wall surface or the flow passage surface.

CITATION LIST

Patent Reference

[Patent Reference 1]
JP 2007-120479 A
[Patent Reference 2]
JP 2006-037877 A

SUMMARY

Technical Problem

As an intake duct for introducing intake air to a compressor, there is an intake duct having a manifold part with a reduced diameter on an inlet side of the compressor, compared to a diameter of an outside-air introduction part of the compressor, so as to straighten the intake air introduced to the compressor, thereby suppressing pressure loss and also suppressing performance decline of the compressor. The manifold part is, for instance, configured to extend downward in a height direction with respect to an installation surface of a cooling coil via a vertical duct extending in a curved manner downward in a direction perpendicular to a horizontal duct where the cooling coil is arranged in the intake duct.

In the case where the intake air is cooled using the intake air cooling system equipped with the above intake duct, there is a concern that the drain water generated by condensation of moisture on the surface of the cooling coil during supercooling or the like scatters downstream, flows on the wall surface of the vertical duct to reach the manifold part and accumulates there. When the accumulated drain water exceeds the limit, the drain water enters the compressor of the gas turbine, causing lock or breakdown of the compressor, damage to compressor blades, and so on. The above mentioned Patent Reference 1 and Patent Reference 2 refer to collecting the drain water passing through the intake duct or the drain water adhering to the wall surface of the intake duct, but there is no description regarding a measure to drain the drain water flowing along the wall surface of the vertical duct disposed on the downstream side of the intake duct.

The present invention has been made in view of the above issues and is intended to provide a new and improved intake air cooling system which is capable of collecting drain water flowing along a wall surface of a vertical duct disposed on a downstream side in an intake duct.

Solution to Problem

One aspect of the present invention is an intake air cooling system for a gas turbine, the system comprising:

an intake duct configured to lead intake air taken in from an intake-air inlet to a compressor of the gas turbine, the intake duct having a vertical duct and a manifold part disposed on a downstream side of the vertical duct;

a cooling part provided in the intake duct and configured to cool the intake air by heat exchange with a cooling medium which is introduced from an outside;

a filter part provided on an inlet side of the manifold part and configured to remove impurities contained in the intake air introduced through the vertical duct; and a drain catcher constituted by a gutter member provided immediately above the filter part along an inner wall surface of the vertical duct, the drain catcher being configured to collect drain water flowing along the inner wall surface of the vertical duct.

According to this aspect of the present invention, the drain catcher is provided along the inner wall surface of the vertical duct on the downstream side of the intake duct. Thus, the drain water flowing along the inner wall surface of the vertical duct can be directly collected.

In this case, in one aspect of the present invention, the vertical duct may have a rectangular cross sectional shape having a long side and a short side, the inner wall surface of the vertical duct may comprise a first inner wall surface along the long side and a second inner wall surface along the short side, the drain catcher may comprise: a first drain catcher provided along the first inner wall surface; and a second drain catcher provided along the second inner wall surface so as to connect to the first drain catcher, and at least the first drain catcher may incline downward relative to a horizontal direction from a center of the first inner wall surface toward the second inner wall surface.

With the above configuration, it is possible to prevent the drain water captured by the first drain catcher from accumulating in the first drain catcher. In this manner, the drain water flows toward the inner wall surface in the short direction of the vertical duct. As a result, it is possible to improve recovery efficiency of the drain water.

In one aspect of the present invention, a discharge part may further be provided at least at an end of the first drain catcher or the second drain catcher to discharge the drain water to the outside of the vertical duct.

With this configuration, the drain water captured by the first drain catcher or the second drain catcher can be discharged to the outside of the vertical duct via the discharge part.

Further, in one aspect of the present invention, a sound absorbing material may be provided at least on the inner wall surface of the vertical duct, and the drain catcher may be arranged away from a lower end of the sound absorbing material with a certain distance.

With this configuration, the drain water flowing along the sound absorbing material can be surely captured.

Advantageous Effects

According to the present invention described above, it is possible to capture the drain water flowing along the wall surface of the vertical duct on the downstream side of the intake duct. Therefore, it is possible to surely capture the drain water even when the drain water generated from condensation on the surface of the cooling coil during supercooling, etc. scatters to the downstream side and enters the vertical duct disposed on the downstream side, and thereby to prevent breakdown or damage of the compressor.

DETAILED DESCRIPTION

An embodiment of the present invention will now be described in detail with reference to the accompanying drawings. It is intended, however, that unless particularly specified, dimensions, materials, shapes, relative positions and the like of components described in the embodiment shall be interpreted as illustrative only and not limitative of the scope of the present invention.

Figure 1:
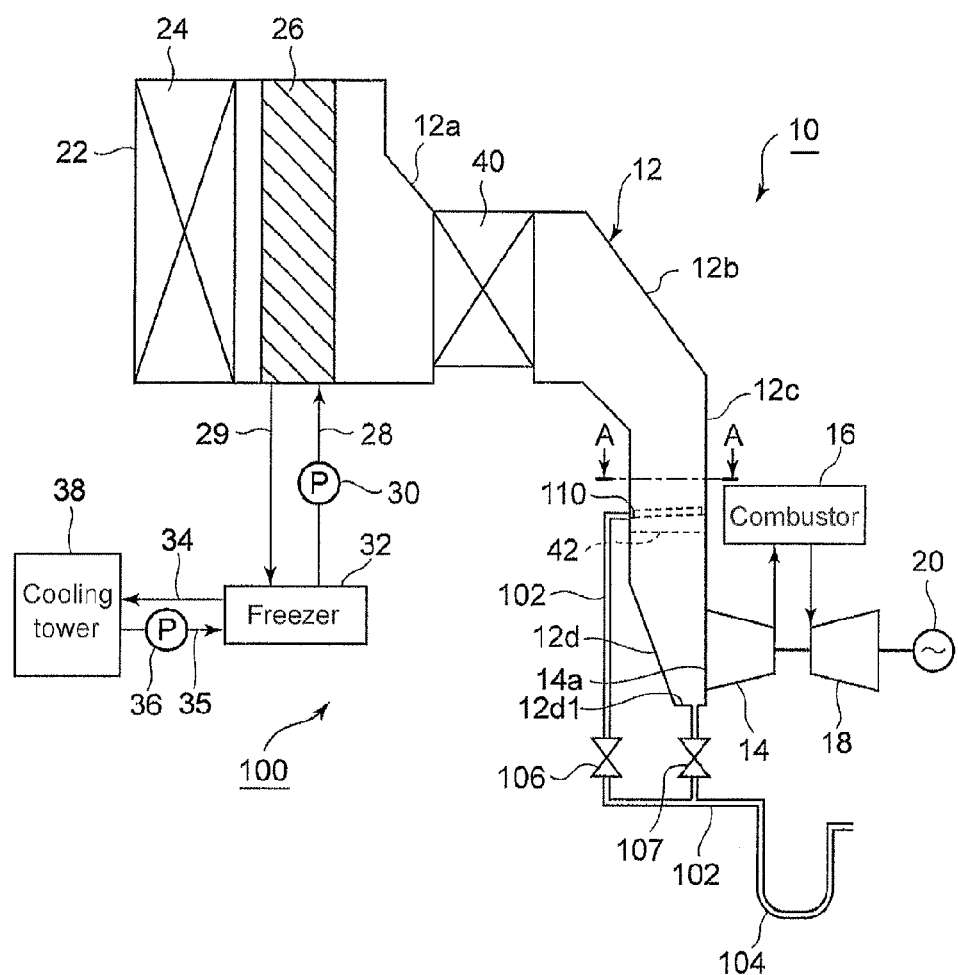
FIG. 1 is a block diagram showing a configuration of a gas turbine plant equipped with an intake air cooling system according to one embodiment of the present invention.

The configuration of the intake air cooling system according to one embodiment of the present invention is described in reference to the accompanying drawings. FIG. 1 is a block diagram showing a configuration of a gas turbine plant equipped with the intake air cooling system according to one embodiment of the present invention.

A gas turbine plant 10 serving as a power generation plant comprises an intake duct 12, a compressor 14, a combustor 16, a gas turbine 18 and a generator 20. Further, an intake air cooling system 100 is provided in the gas turbine plant 10 to cool intake air of the gas turbine 18. In this embodiment, the intake air cooling system 100 comprises at least the intake duct 12, a cooling coil 26 (a cooling part), a chiller 32, a cooling tower 38, a drain discharge line 102, a water seal part 104 and a drain catcher 110. As another embodiment, the intake air cooling system 100 may be configured to spray water to intake air so as to cool the intake air by vaporization heat of the water.

The intake duct 12 is configured to lead the intake air (outside air: air) taken in from an intake-air inlet 22 to the compressor 14. The compressor 14 is configured to compress the intake air supplied via the intake duct 12. The combustor 16 is configured to combust fuel using the intake air supplied from the compressor 14. The gas turbine 18 is configured to be rotated by combustion gas supplied from the combustor 16. The generator 20 is configured to generate power by rotation of the gas turbine 18.

The intake duct 12 comprises, as illustrated in FIG. 1, a horizontal duct 12a, a curved duct 12b, and a vertical duct 12c in this order from an upstream side to a downstream side. On a downstream side of the vertical duct 12c, a manifold part 12d is provided for leading and straightening the intake air to the compressor 14. In this embodiment, the manifold part 12d is configured to extend downward via the vertical duct 12c curving downward in a direction perpendicular to the horizontal duct 12a.

On the inlet side of the intake duct 12, a prefilter 24 is provided to remove relatively large particles of dust or the like from the intake air taken in from the intake-air inlet 22. Further, on a downstream side of the prefilter 24 in the intake duct 12 (the horizontal duct 12a), the cooling coil 26 is provided to cool the intake air exiting the prefilter 24 by heat exchange with a cooling medium introduced from an outside. Under the cooling coil 26, a drain pan (not shown) is provided to collect drain water condensed by cooling of the intake air by heat exchange with the cooling coil 26. The drain water collected by the drain pan is discharged to the outside of the intake duct 12 from a drain pipe (not shown).

Cold circulation water (cooling medium) is supplied to the cooling coil 26 from the chiller 32, such as an absorption chiller or a centrifugal chiller, via a first circulation path 28 and a first circulation pump 30. The circulation water is heated by heat exchange with the intake air in the intake air cooling coil 26 and then returned to the chiller 32 via the first circulation path 29. Cold circulation water is supplied to the chiller 32 from the cooling tower 38 via second circulation paths 34, 35 and a second circulation pump 36. The circulation water is used in the chiller 32 to perform heat exchange with the circulation water circulating in the first circulation paths 28, 29 and then returned to the cooling tower 38 via the second circulation path 34 to be cooled again in the cooling tower 38.

A silencer 40 is provided in the horizontal duct 12a of the intake duct 12 on the downstream side of the cooling coil 26, so as to suppress vibration including noise generated when taking in the air. A filter 42 is provided on the inlet side of the manifold part 12d connected to the vertical duct 12c of the intake duct 12. The filter 42 is provided to serve as a filter part for removing impurities contained in the intake air introduced via the vertical duct 12c and screws, etc. which have fallen during work or the like in the intake duct.

The intake air cooling system 100 has a function of collecting drain water generated from cooling of the intake air by heat exchange at the cooling coil 26 so as to prevent the drain water from entering the compressor 14. In this embodiment, the drain catcher 110 configured to collect the drain water which is generated on the surface of the cooling coil 26 and flows along the inner wall surface of the vertical duct 12c due to scatter, etc. to the downstream side is provided immediately above the filter 42 along the inner wall surface of the vertical duct 12c.

The drain catcher 110 forms an L-shaped cross-section in the axial direction of the vertical duct 12c, as illustrated in FIG. 1. The drain catcher 110 is arranged so that one side of the L-shape is approximately parallel to the inner wall surface of the vertical duct 12c and away from the inner wall surface of the vertical duct 12c with a space therebetween. The drain catcher 110 is arranged to open to the upstream side in the vertical duct 12c. As a result, the drain water flowing along the inner wall surface of the vertical duct 12c can be captured by the drain catcher 110. Further, the drain water captured by the drain catcher 110 is then discharged to the outside of the vertical duct 12c through the drain discharge line 102 connected to the drain catcher 110.

Figure 2A:
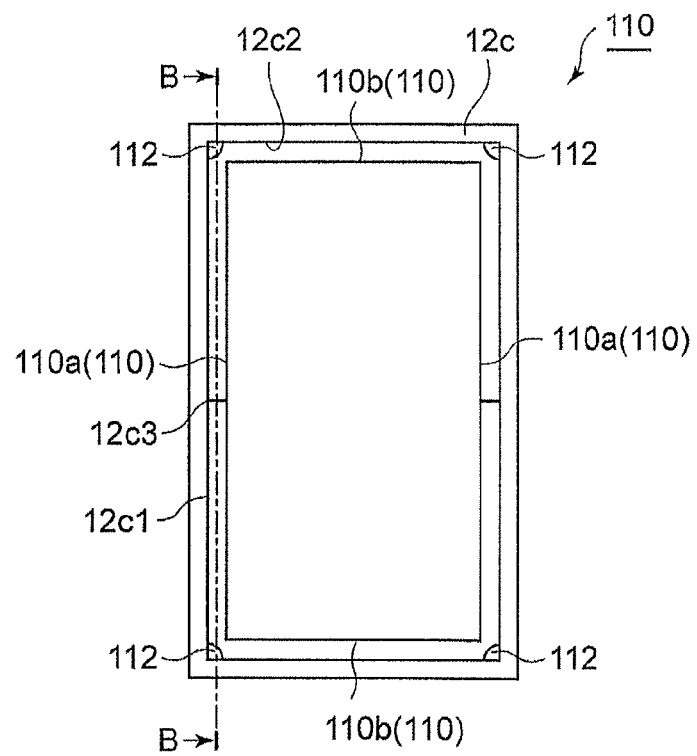
FIG. 2A is a cross-sectional view of a schematic configuration of a drain catcher provided in the intake air cooling system according to one embodiment of the present invention, taken in A-A direction of FIG. 1.
Figure 2B:
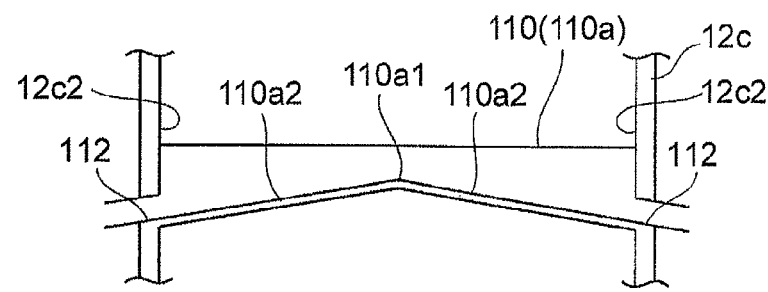
FIG. 2B is a cross-sectional view taken in B-B direction of FIG. 2A.

Next, the configuration of the drain catcher provided in the intake air cooling system according to one embodiment of the present invention will be described in reference to the accompanying drawings. FIG. 2A is a cross-sectional view of a schematic configuration of the drain catcher provided in the intake air cooling system according to one embodiment of the present invention, taken in A-A direction of FIG. 1. FIG. 2B is a cross-sectional view taken in B-B direction of FIG. 2A.

The drain catcher 110 is constituted by a gutter member provided immediately above the filter 42 along inner wall surfaces 12c1, 12c2 of the vertical duct 12c, and is configured to collect the drain water flowing along the inner wall surfaces 12c1, 12c2. In this embodiment, as illustrated in FIG. 2A, the vertical duct 12c has a rectangular cross sectional shape having a long side and a short side. The drain catcher 110 comprises a first catcher 110a on a long side and a second drain catcher 110b on a short side.

Further, in this embodiment, as illustrated in FIG. 2A, a discharge part 112 is provided on each corner of the drain catcher 110 to discharge the drain water to the outside of the vertical duct 12c. Specifically, the discharge part 112 is provided at ends of the first drain catcher 110a and the second drain catcher 110b, so as to discharge the drain water captured by the first drain catcher 110a or the second drain catcher 110b to the outside of the vertical duct 12c.

The first drain catcher 110a is provided along each of the inner wall surface (the first inner wall surface) 12c1 which is disposed along the longitudinal direction (long side) of the cross-section of the vertical duct 12c. The second drain catcher 110b is provided along the inner wall surface (second inner wall surface) 12c2 which is disposed along the short direction (short side) of the cross-section of the vertical duct 12c, so as to connect to the first drain catcher 110a.

Furthermore, in this embodiment, as illustrated in FIG. 2B, the first drain catcher 110a inclines downward relative to a horizontal direction from a center part 12c3 of the inner wall surface 12c1 in the longitudinal direction of the vertical duct 12c, toward the inner wall surface 12c2 in the short direction of the vertical duct 12c. Specifically, a bottom 110a2 of the first drain catcher 110a is arranged such that a middle part 110a1 is high and the surface inclines downward from the middle part 110a1 toward the end where the discharge part 112 is located.

There is a concern regarding the vertical duct 12c that, in the case where the length in the longitudinal direction is about 7 m, the drain water captured by the first drain catcher 110a accumulates within the first drain catcher 110a. Therefore, in this embodiment, to prevent the captured drain water from accumulating in the first drain catcher 110a, the bottom 110a2 of the first drain catcher 110a inclines so that the drain water can flow toward the discharge part 112. As a result, it is possible to prevent the captured drain water from accumulating in the drain catcher 110a, and thereby to improve recovery efficiency of the drain water.

In this embodiment, only the first drain catcher 110a has the inclined bottom. This is, however, not restrictive and the second drain catcher 110b may also have an inclined bottom so that the drain water captured by the second drain catcher 110b flows toward the discharge part 112.

Figure 3:
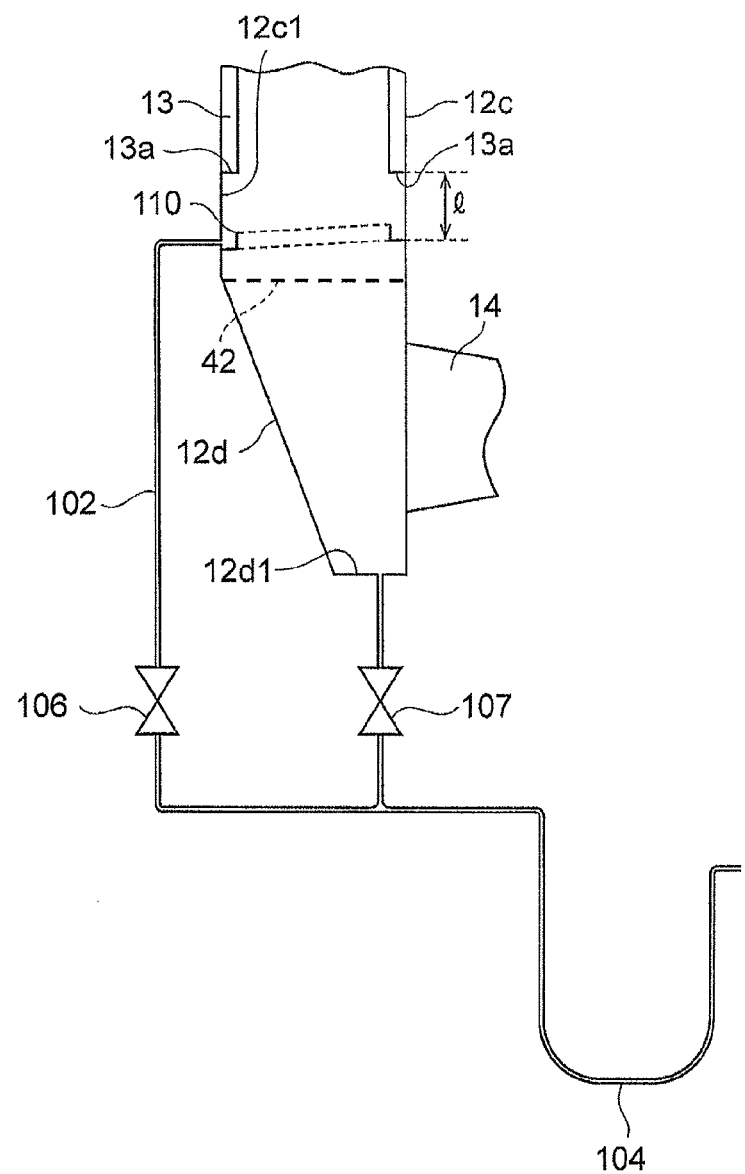
FIG. 3 is an illustration of a drain catcher and a drain discharge line which are provided in the intake air cooling system according to one embodiment of the present invention.

Next, the drain catcher and the drain discharge line provided in the intake air cooling system according to one embodiment of the present invention will be described in details in reference to the accompanying drawings. FIG. 3 is an illustration of the drain catcher and the drain discharge line which are provided in the intake air cooling system according to one embodiment of the present invention.

When introducing the intake air to the compressor 14, noise and vibration are generated. To suppress the noise and vibration, a sound absorbing material is provided on the inner wall surface of the intake duct 12. The sound absorbing material may include urethane, sponge, glass wool or the like. Thus, when arranging the drain catcher 110 on the inner wall surfaces 12c1, 12c2 of the vertical duct 12c, it is necessary to consider a thickness of the sound absorbing material.

In this embodiment, as illustrated in FIG. 3, the drain catcher 110 is provided in a section of the inner wall surface 12c1 of the vertical duct 12c, where the sound absorbing material 13 is not arranged, and the drain catcher 110 is arranged away from a lower end 13a of the sound absorbing material 13 with a certain distance 1. In the case where the drain catcher 110 is arranged with the thickness of the sound absorbing material 13 taken into consideration, it is necessary to increase the width of the drain catcher 110 in the longitudinal direction by an amount of the thickness of the sound absorbing material 13. This creates a concern that the intake passage of the vertical duct 12c becomes narrow due to the increased width of the drain catcher 110 and hence the intake efficiency decreases.

Therefore, in this embodiment, the drain catcher 110 is provided in the section of the inner wall surfaces 12c1, 12c2 of the vertical duct 12c where the sound absorbing material 13 is not provided. Specifically, the drain catcher 110 can be installed without increasing the width of the drain catcher 110 in the longitudinal direction by an amount of the thickness of the sound absorbing material 13.

Further, there is a concern that, when the drain catcher 110 is arranged immediately below the lower end 13a of the sound absorbing material 13, the drain water flows along the surface of the sound absorbing material 13 and strays from the drain catcher 110 due to the thickness of the sound absorbing material 13. In this embodiment, to reliably capture the drain water flowing along the sound absorbing material 13, the drain catcher 110 is arranged away from the lower end 13a of the sound absorbing material 13 with the distance 1. Specifically, the drain catcher 110 is preferably arranged away from the lower end 13a of the sound absorbing material 13 with a distance of at least approximately 1 m.

The drain water captured by the drain catcher 110 is, as illustrated in FIG. 3, discharged to the outside of the vertical duct 12c through the drain discharge line 102 connected to the drain catcher 110. In this embodiment, a valve 106 for opening and closing the drain discharge line 102 and a water seal part 104 for preventing entry of impurities from the outside of the vertical duct 12c are provided in the drain discharge line 102. Further, the drain discharge line 102 is connected to a bottom side 12d1 of the manifold part 12d via a valve 107 so as to discharge also the drain water accumulated in the manifold part 12d.

In this embodiment, the drain catcher 110 is provided along the inner wall surfaces 12c1, 12c2 of the vertical duct 12c on the downstream side of the intake duct 12. Thus, the drain water flowing along the inner wall surfaces 12c1, 12c2 of the vertical duct 12c can be directly collected. Further, by providing the drain catcher 110 immediately above the filter 42, it is possible to efficiently capture the drain water generated by the intake air condensing on the wall surface of the curved duct 12b while colliding against the wall surface during air suction, and flowing along the vertical duct 12c.

Further, the drain catcher 110 of this embodiment can be newly installed in an existing gas turbine plant when the operation of the gas turbine plant is stopped for inspection or the like. In this case, the drain catcher 110 is installed in a section of the inner wall surface of the vertical duct where the sound absorbing material 13 is partially removed, and away from the lower end of the sound absorbing material with the certain distance 1. In this manner, the drain catcher 110 of this embodiment can be installed in existing gas turbine plants and is capable of efficiently capturing the drain water flowing along the vertical duct.

While the embodiment of the present invention has been described, it is obvious to those skilled in the art that various changes and modifications may be made without materially departing from the novel teachings and advantages of this invention. Accordingly, all such modifications are intended to be included within the scope of this invention.

Any term cited with a different term having a broader meaning or the same meaning at least once in the specification or the drawings can be replaced by the different term in any place in the specification or the drawings. The configuration and the operation of the intake air cooling system for the gas turbine or the gas turbine plant are not limited to those described in connection with the above embodiment, and various modifications and variations may be made.

REFERENCE SIGNS LIST

10 Gas turbine plant
12 Intake duct
12a Horizontal duct
12b Curved duct
12c Vertical duct
12c1 Inner wall surface (of longitudinal direction)
12c2 Inner wall surface (of short direction)
12d Manifold part
12d1 Bottom side (of a manifold part)
13 Sound absorbing material
14 Compressor
14a Inlet (of a compressor)
16 Combustor
18 Gas turbine
20 Generator
22 Intake-air inlet
24 Prefilter
26 Cooling coil (Cooling part)
28, 29 First circulation path
30 First circulation pump
32 Chiller
34, 35 Second circulation path
36 Second circulation pump
38 Cooling tower
40 Silencer
42 Filter (Filter part)
100 Intake air cooling system
102 Drain discharge line
104 U-shaped pipeline (Water seal part)
106, 107 Valve
110 Drain catcher
110a First drain catcher
110b Second drain catcher
112 Discharge part

The invention claimed is:

1. An intake air cooling system for a gas turbine, the system comprising:
   an intake duct configured to lead intake air taken in from an intake-air inlet to a compressor of the gas turbine, the intake duct having a vertical duct and a manifold part disposed on a downstream side of the vertical duct;
   a cooling part provided in the intake duct and configured to cool the intake air by heat exchange with a cooling medium which is introduced from an outside;
   a filter part provided on an inlet side of the manifold part and configured to remove impurities contained in the intake air introduced through the vertical duct; and
   a drain catcher constituted by a gutter member provided immediately above the filter part along an inner wall surface of the vertical duct, the drain catcher being configured to collect drain water flowing along the inner wall surface of the vertical duct.

2. The intake air cooling system according to claim 1,
   wherein the vertical duct has a rectangular cross sectional shape having a long side and a short side,
   wherein the inner wall surface of the vertical duct comprises a first inner wall surface along the long side and a second inner wall surface along the short side,
   wherein the drain catcher comprises:
      a first drain catcher provided along the first inner wall surface; and
      a second drain catcher provided along the second inner wall surface so as to connect to the first drain catcher, and
   wherein at least the first drain catcher inclines downward relative to a horizontal direction from a center of the first inner wall surface toward the second inner wall surface.

3. The intake air cooling system according to claim 2,
   a discharge part at least at an end of the first drain catcher or the second drain catcher to discharge the drain water to the outside of the vertical duct.

4. The intake air cooling system according to claim 2,
   a sound absorbing material at least on the inner wall surface of the vertical duct,
   wherein the drain catcher is arranged away from a lower end of the sound absorbing material with a certain distance.

5. The intake air cooling system according to claim 3,
   a sound absorbing material at least on the inner wall surface of the vertical duct,
   wherein the drain catcher is arranged away from a lower end of the sound absorbing material with a certain distance.

6. The intake air cooling system according to claim 1,
a sound absorbing material at least on the inner wall surface of the vertical duct,
wherein the drain catcher is arranged away from a lower end of the sound absorbing material with a certain distance.

\* \* \* \* \*